US010912293B1

(12) United States Patent
Miller

(10) Patent No.: US 10,912,293 B1
(45) Date of Patent: Feb. 9, 2021

(54) BODY SUPPORT STAND

(71) Applicant: David Miller, Boylston, MA (US)

(72) Inventor: David Miller, Boylston, MA (US)

(*) Notice: Subject to any disclaimer, the term of this patent is extended or adjusted under 35 U.S.C. 154(b) by 0 days.

(21) Appl. No.: 16/448,356

(22) Filed: Jun. 21, 2019

Related U.S. Application Data

(63) Continuation of application No. 13/738,055, filed on Jan. 10, 2013, now abandoned.

(60) Provisional application No. 61/599,885, filed on Feb. 6, 2012.

(51) Int. Cl.
*A01M 31/02* (2006.01)

(52) U.S. Cl.
CPC .................... *A01M 31/02* (2013.01)

(58) Field of Classification Search
CPC ... A01M 31/02; B60N 2/1695; B60N 2/1814; B60N 2/1935; B64D 2011/0606
USPC ................... 182/128, 187; 297/335
See application file for complete search history.

(56) References Cited

U.S. PATENT DOCUMENTS

| | | | | |
|---|---|---|---|---|
| 1,167,597 A * | 1/1916 | Riehm | ...................... | A47C 7/62 297/188.1 |
| 2,950,753 A * | 8/1960 | Gleitsman | ............. | A47C 16/025 297/188.01 |
| 3,158,398 A * | 11/1964 | Stryker | .................... | A61G 5/14 297/333 |
| 3,250,569 A * | 5/1966 | Gaffney | .................... | A61G 5/14 297/330 |
| 3,682,109 A * | 8/1972 | Gordon | ................ | A47B 13/081 108/9 |
| 3,940,181 A * | 2/1976 | Cheek, Jr. | ............ | A47C 16/025 297/423.46 |
| 4,129,198 A * | 12/1978 | Hunter | ...................... | E04G 3/24 108/152 |
| 4,236,602 A * | 12/1980 | Leggett | ...................... | A45F 3/26 182/187 |
| 4,369,858 A * | 1/1983 | Babb | ........................ | A45F 3/26 182/134 |
| 4,782,918 A * | 11/1988 | Brunner | ................ | A01M 31/02 108/152 |
| 4,848,243 A * | 7/1989 | Giordano | ............. | A47B 23/043 108/9 |
| 5,011,224 A * | 4/1991 | Paul | ........................ | A61G 5/14 297/339 |
| 5,082,327 A * | 1/1992 | Crisp | ...................... | A61G 5/14 297/313 |

(Continued)

*Primary Examiner* — Daniel P Cahn
*Assistant Examiner* — Shiref M Mekhaeil
(74) *Attorney, Agent, or Firm* — Patent Service Associates, Inc.; Lyman Smith

(57) ABSTRACT

A stand includes a frame and a mounting mechanism coupled to the frame. The frame includes a first platform disposed at a first end of the frame and extending along a proximal direction relative to the frame. The frame includes a second platform disposed at a second end of the frame, the second end opposing the first end. The second platform extends along the proximal direction relative to the frame and is configured to translate relative to the first platform between a first position and a second position to dispose the second platform at a vertical distance of between about 24 inches and 36 inches relative to the first platform. The stand includes a seat portion coupled to the second platform, the seat portion configured to rotate relative to, and about a proximal perimeter portion of, the second platform between a first seat position and a second seat position.

17 Claims, 7 Drawing Sheets

(56) References Cited

U.S. PATENT DOCUMENTS

| | | | | |
|---|---|---|---|---|
| 5,143,177 | A * | 9/1992 | Smith | A01M 31/02 182/136 |
| 5,316,370 | A * | 5/1994 | Newman | A61G 5/14 297/313 |
| 5,328,239 | A * | 7/1994 | Yamazaki | A47C 7/56 297/333 |
| 5,346,280 | A * | 9/1994 | Deumite | A61G 5/14 180/907 |
| 5,409,083 | A * | 4/1995 | Thompson | A01M 31/02 108/152 |
| 5,439,074 | A * | 8/1995 | Trout | A01M 31/02 108/152 |
| 5,462,135 | A * | 10/1995 | Ambler | A01M 31/02 182/187 |
| 5,518,083 | A * | 5/1996 | Blennert | A01M 31/02 182/188 |
| 5,562,180 | A * | 10/1996 | Herzog | A01M 31/02 108/152 |
| 5,803,545 | A * | 9/1998 | Guguin | A61G 5/14 297/316 |
| 5,918,936 | A * | 7/1999 | Murphy | A61G 5/14 297/313 |
| 5,927,437 | A * | 7/1999 | Fast | A01M 31/02 182/187 |
| RE36,276 | E * | 8/1999 | Smith | A01M 31/02 182/136 |
| 6,085,868 | A * | 7/2000 | Anthony | A01M 31/02 108/152 |
| 6,113,188 | A * | 9/2000 | Stewart | A61G 5/14 297/339 |
| 6,196,354 | B1 * | 3/2001 | Anthony | A01M 31/02 108/152 |
| 6,308,800 | B1 * | 10/2001 | Graham, Jr. | A01M 31/02 182/136 |
| 6,367,585 | B1 * | 4/2002 | Fast | A01M 31/02 182/135 |
| 6,386,321 | B1 * | 5/2002 | Muhich | A01M 31/02 182/135 |
| 6,571,916 | B1 * | 6/2003 | Swanson | A01M 31/02 108/152 |
| 6,578,854 | B2 * | 6/2003 | Wucherpfennig | A63B 71/0009 180/330 |
| 6,601,811 | B1 * | 8/2003 | Van Lieshout | F16M 11/08 248/282.1 |
| 6,811,225 | B1 * | 11/2004 | Konya | A47C 9/005 297/321 |
| 6,830,128 | B2 * | 12/2004 | Burgeson | A01M 31/02 182/116 |
| 6,866,120 | B1 * | 3/2005 | Butterworth | A01M 31/02 108/152 |
| 6,877,807 | B2 * | 4/2005 | Mizuno | B60N 2/305 297/188.08 |
| 6,959,786 | B2 * | 11/2005 | Craft | A01M 31/02 108/152 |
| RE39,725 | E * | 7/2007 | Muhich | 182/135 |
| 7,434,882 | B1 * | 10/2008 | Hodges | A61G 5/14 257/E21.694 |
| 7,861,987 | B2 * | 1/2011 | Gorsuch | F41B 5/14 124/86 |
| 7,971,685 | B2 * | 7/2011 | Simone | A01M 31/02 182/133 |
| 8,074,770 | B2 * | 12/2011 | Worobey | A01M 31/02 182/187 |
| 8,205,561 | B1 * | 6/2012 | Bierworth | A47C 7/70 108/9 |
| 8,282,171 | B1 * | 10/2012 | Stocker | A47C 7/021 297/440.15 |
| 8,522,920 | B1 * | 9/2013 | Salyer | A01M 31/02 182/187 |
| 8,534,423 | B1 * | 9/2013 | Brabham | A01M 31/02 182/187 |
| 8,556,036 | B1 * | 10/2013 | Meredith | A01M 31/02 182/113 |
| 8,740,304 | B2 * | 6/2014 | Yu | A61G 5/14 297/330 |
| 8,944,507 | B2 * | 2/2015 | Goetz | A47C 7/462 297/344.15 |
| 9,089,125 | B1 * | 7/2015 | Fast | E04G 3/24 |
| D740,380 | S * | 10/2015 | Sorensen, II | D21/687 |
| 10,449,100 | B2 * | 10/2019 | Hector | A61G 5/14 |
| D893,215 | S * | 8/2020 | Qiu | D6/381 |
| 10,758,439 | B1 * | 9/2020 | Lake | A47C 7/02 |
| 2003/0090135 | A1 * | 5/2003 | Newman | A61G 5/14 297/313 |
| 2003/0192741 | A1 * | 10/2003 | Berkbuegler | A01M 31/02 182/187 |
| 2006/0207833 | A1 * | 9/2006 | Kessinger | A01M 31/02 182/187 |
| 2007/0000726 | A1 * | 1/2007 | Berkbuegler | A01M 31/02 182/187 |
| 2007/0095614 | A1 * | 5/2007 | Mannor | A01M 31/02 182/187 |
| 2007/0181365 | A1 * | 8/2007 | Braud | A01M 31/02 182/115 |
| 2007/0182233 | A1 * | 8/2007 | Boyko | A47C 1/026 297/411.35 |
| 2009/0115167 | A1 * | 5/2009 | Chin | B62K 11/10 280/639 |
| 2009/0242700 | A1 * | 10/2009 | Raymond | B60N 2/1695 244/118.6 |
| 2009/0321186 | A1 * | 12/2009 | Louchart | A01M 31/02 182/188 |
| 2011/0126739 | A1 * | 6/2011 | Korpi | A47B 23/044 108/6 |
| 2012/0236527 | A1 * | 9/2012 | Zhou | F16M 11/041 361/807 |
| 2012/0292879 | A1 * | 11/2012 | Ferniany | A61G 5/14 280/250.1 |
| 2015/0374564 | A1 * | 12/2015 | Sutton | A61G 5/061 280/657 |

* cited by examiner

BODY SUPPORT STAND

CROSS-REFERENCE TO RELATED APPLICATIONS

This patent application is a continuation of U.S. patent application Ser. No. 13/738,055, filed Jan. 10, 2013, which claims the benefit of U.S. Provisional Application No. 61/599,885 filed on Feb. 16, 2012, the contents and teachings of both of which are hereby incorporated by reference in their entirety.

BACKGROUND

Conventional tree stands allow a user, such as a hunter, to position himself above the ground to minimize detection by animals during hunting or observation. Typically, a user sits on a tree stand platform while waiting for, or observing, the animals. With such a configuration, the conventional tree stands minimize a user's fatigue in use, such as caused by standing for extended periods of time.

SUMMARY

Conventional tree stands suffer from a variety of deficiencies. As indicated above, certain conventional tree stands allow a user such as a hunter or photographer to sit while waiting for, or observing, animals. However, with such positioning position, the user can experience difficulty in moving his camera or hunting equipment to target the animal without detection. For example, in a sitting position, movement of a bow and arrow to a targeting position requires the hunter to stand from the sitting position prior to targeting the animal which can alert the animal to the presence of the hunter. Other conventional tree stands allow the user to remain standing at all times. However, such positioning can cause the user leg fatigue.

By contrast to conventional tree stands, embodiments of the present innovation relate to a body support stand. In one arrangement, the body support stand allows a user to remain in a partially-standing, partially-sitting position for an extended period of time. For example, the stand includes a frame having a foot support platform and a height-adjustable and angle adjustable seat element. In use, the user can adjust the seat height and angle based upon his own physical dimensions and can lean against the seat in a semi-standing position. With such a configuration, the stand positions the user to view a target, such as an animal, while maintaining the user in a firing ready position. Accordingly, the stand allows the user to move a minimal' amount when targeting the animal, thereby minimizing the chances of alerting the animal to the user's presence. Also, with such a configuration, the stand reduces the load on the user's legs over time, thereby minimizing leg fatigue and providing a level of the safety of the user.

One arrangement of the innovation relates to a stand, such as a body support stand, which includes a frame and a mounting mechanism coupled to the frame. The frame includes a first platform disposed at a first end of the frame and extending along a proximal direction relative to the frame. The frame includes a second platform disposed at a second end of the frame, the second end opposing the first end. The second platform extends along the proximal direction relative to the frame and is configured to translate relative to the first platform between a first position and a second position to dispose the second platform at a vertical distance of between about 24 inches and 36 inches relative to the first platform. The stand includes a seat portion coupled to the second platform, the seat portion configured to rotate relative to, and about a proximal perimeter portion of, the second platform between a first seat position and a second seat position.

One arrangement of the innovation relates to a stand which includes a frame and a mounting mechanism coupled to the frame, the mounting mechanism being configured to couple the frame to a support. The stand includes a first platform disposed at a first end of the frame and extending along a proximal direction relative to the frame. The stand includes a second platform disposed at a second end of the frame, the second end opposing the first end, the second platform extending along the proximal direction relative to the frame and the second platform configured to translate relative to the first platform between a first position and a second position to dispose the second platform at a vertical distance of between about 24 inches and 36 inches relative to the first platform. The stand includes a seat portion coupled to the second platform, the seat portion configured to rotate relative to the second platform and about a proximal perimeter portion between a first seat position and a second seat position and within an angle range of between about 0° and 80° relative to the second platform.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

DETAILED DESCRIPTION

Embodiments of the present innovation relate to a body support stand. In one arrangement, the body support stand allows a user to remain in a partially-standing, partially sitting position for an extended period of time. For example, the stand includes a frame having a foot support platform and a height-adjustable and angle-adjustable seat element. In use, the user can adjust the seat height and angle based upon his own physical dimensions and can lean against the seat in a semi-standing position. With such a configuration, the stand positions the user to view a target, such as an animal, while maintaining the user in a firing ready position. Accordingly, the stand allows the user to move a minimal amount when targeting the animal, thereby minimizing the chances of alerting the animal to the user's presence. Also, with such a configuration, the stand reduces the load on the user's legs over time, thereby minimizing leg fatigue and providing a level of the safety of the user.

Figure 1:
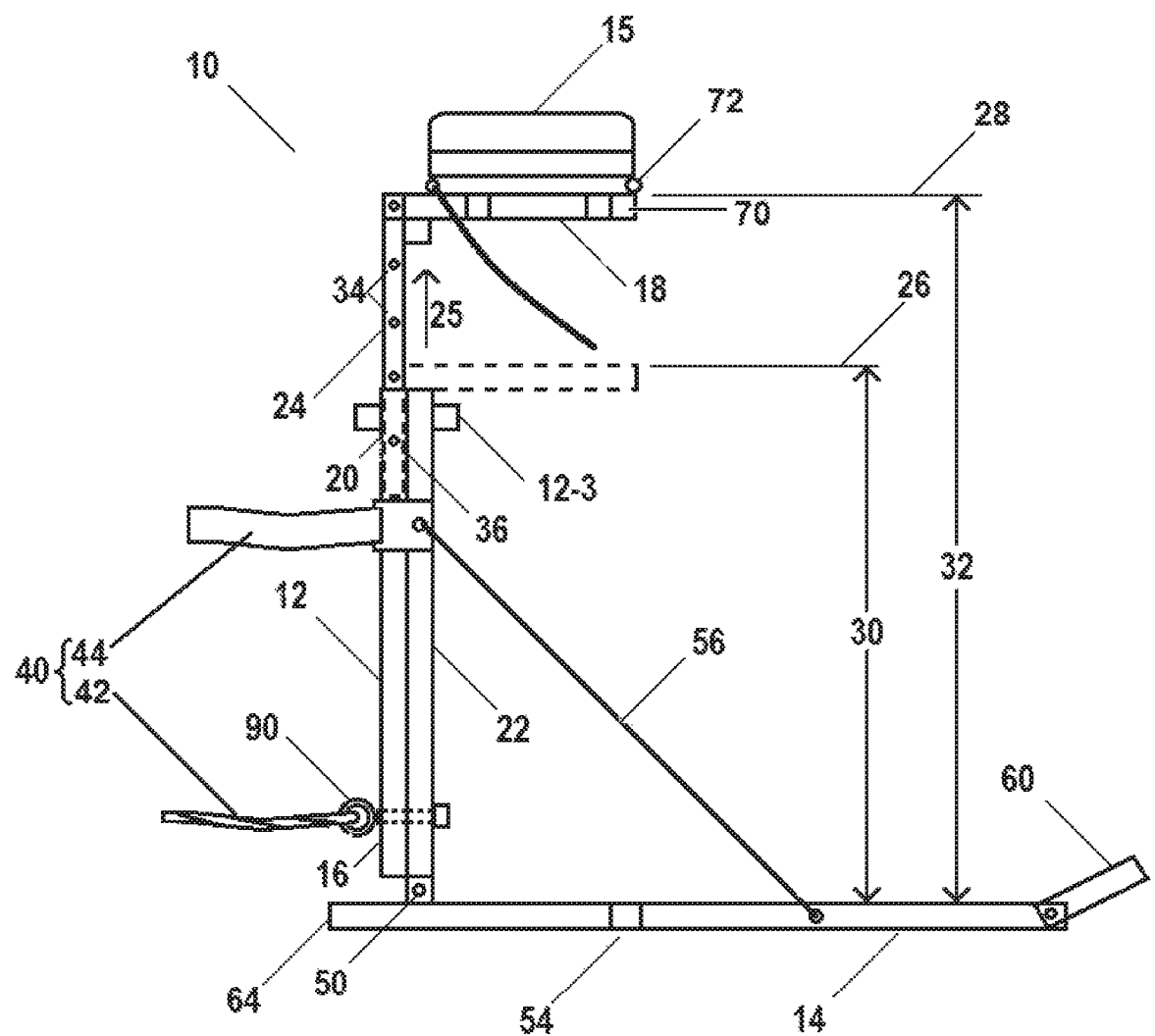
FIG. 1 illustrates a schematic representation of a side view of a stand according to one arrangement, a seat portion of the stand disposed in a first position.
Figure 2:
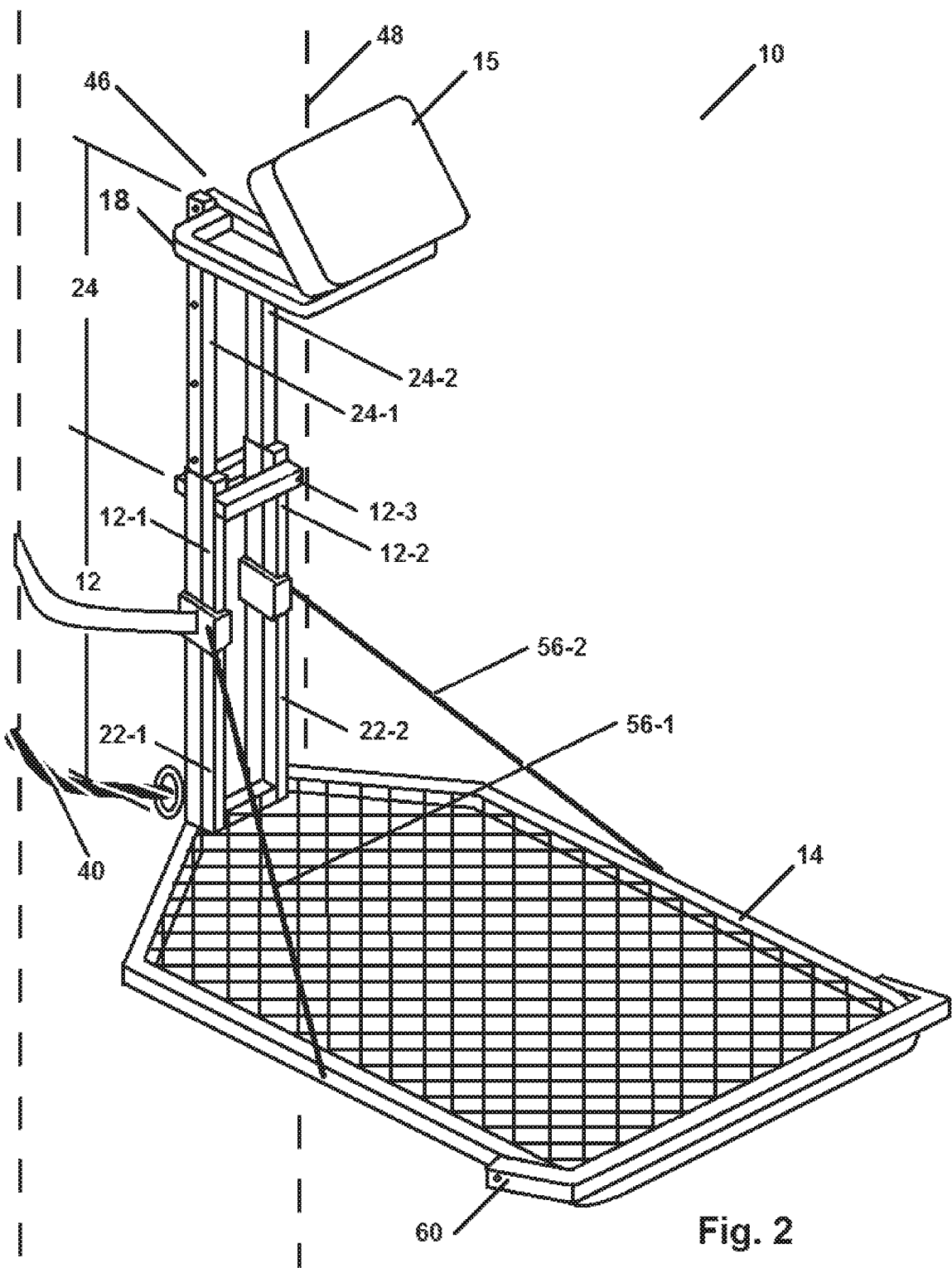
FIG. 2 illustrates a side perspective view of the stand of FIG. 1, according to one arrangement.
Figure 3:
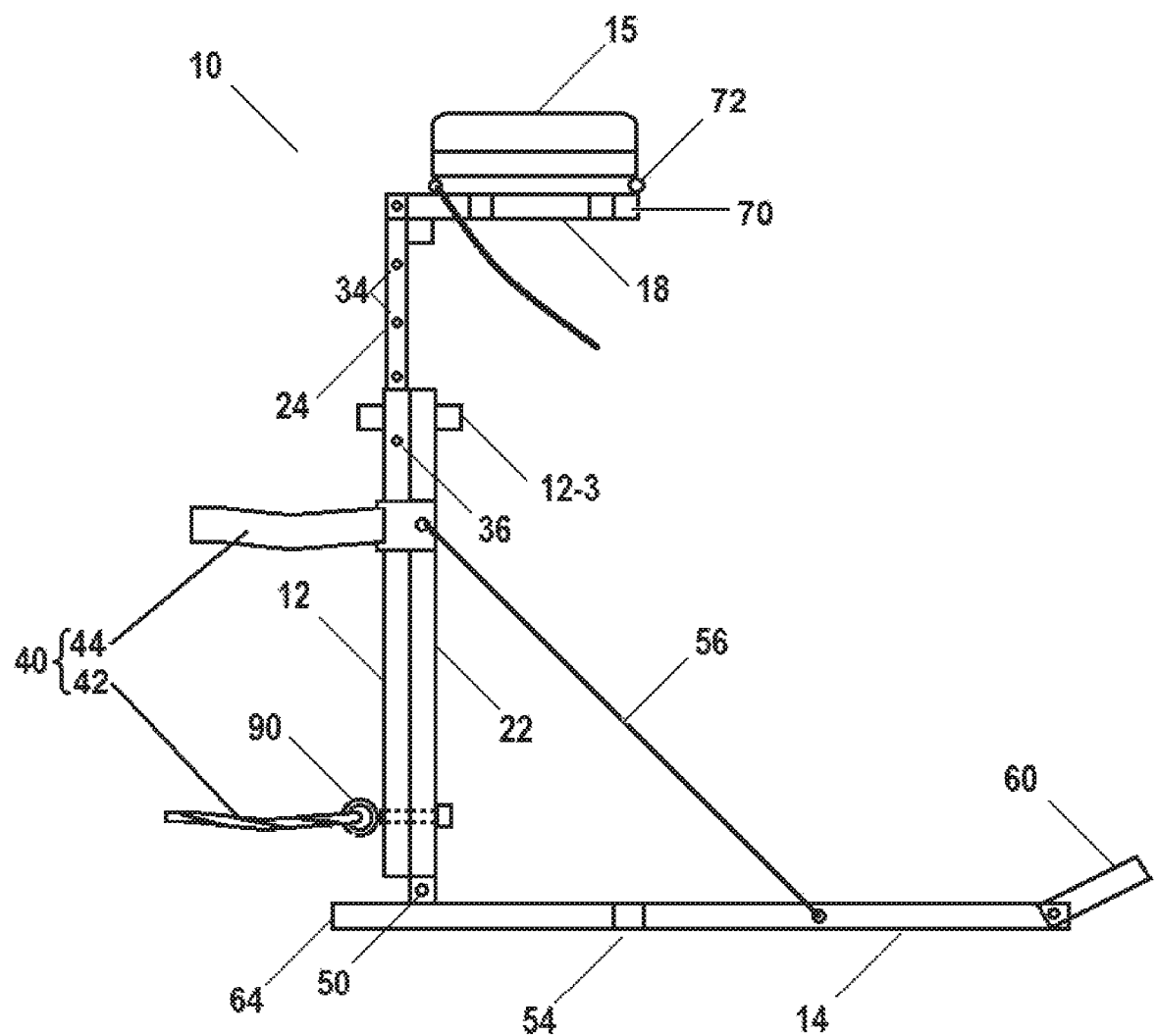
FIG. 3 illustrates the stand of FIG. 1 having the seat portion disposed in a second position, according to one arrangement.

FIGS. 1-3 illustrate a stand 10, such as a body support stand, according to one arrangement. The stand 10 is configured to support a user's body in a partially-standing, partially-sitting position for an extended period of time. For example, the stand 10 includes a frame 12, a first platform 14 coupled to a first end 16 of the frame 12, a second platform 18 coupled to a second end 20 of the frame 12, and a seat portion 15 coupled to the second platform 18. As indicated, each of the first and second platform 14, 18 extend along a proximal direction relative to the frame 12 such that the first and second platforms 14, 18 are substantially parallel to one other. With such a configuration, a distal portion of the stand 10 can be placed against and secured to a support 48, such as a tree as illustrated in FIG. 2, and as will be described in detail below.

The frame 12 can be structurally configured in a variety of ways. For example, with reference to FIG. 2, the frame 12 includes a pair of substantially parallel frame elements 12-1, 12-2, coupled to both the first platform 14 and the second platform 18, and a cross brace 12-3 extending there between. Additionally, the frame 12 can be manufactured from a variety of materials. For example, the frame 12 can be manufactured from a substantially square aluminum tubing material to provide rigidity to the stand 10 while minimizing the overall weight of the stand 10.

In one arrangement, the frame 12 includes a first frame portion 22 coupled to the first platform 14 and a second frame portion 24 coupled to the second platform 18 where the second frame portion 24 is configured to translate relative to the first frame portion 22. For example, with reference to FIG. 2, the second frame portion 24 includes a first substantially tubular element 24-1 slidably disposed within the first frame element 22-1 and a second substantially tubular element 24-2 slidably disposed within the second frame element 22-2. With such a configuration, the second frame portion 24 is configured to position the second platform 18 between a retracted position 26 and an extended position 28 relative to the first platform 14. For example, in the retracted position 26, the second frame portion 24 holds the second platform 18 at a distance 30 of about twenty-four (24) inches from the first platform 14. In the retracted position 26, the stand 10 is configured to provide a user with fully-seated positioning. From the retracted position 26, the first and second substantially tubular elements 24-1, 24-2 slide relative to the corresponding first and second frame elements 22-1, 22-2 along direction 25 to the extended position 28. In the extended position 28, the second frame portion 24 holds the second platform 18 at a distance 32 of about thirty-six (36) inches from the first platform 14 (i.e., a partially-seated, partially-standing position).

In one arrangement, the first and second frame portions 22, 24 include a locking mechanism (not shown) configured to secure the second platform 18 at a fixed distance from the first platform 14 between the retracted and extended positions 26, 28. For example, the first and second substantially tubular elements 24-1, 24-2 can each define a set of openings 34, each opening being configured to align with a corresponding opening in the first and second frame elements 22-1, 22-2. In use, once a user sets the height of the second platform 18 at a particular distance from the first platform 14, the user aligns an opening 34 in each of the first and second substantially tubular elements 24-1, 24-2 with a corresponding opening 36 in each of the first and second frame elements 22-1, 22-2 and inserts a pin (not shown) into the aligned openings 34, 36 to lock the second platform 18 at the selected distance from the first platform 14.

In one arrangement, the frame 12 is configured to be secured to a support 48 such as a tree, pole, or other substantially cylindrical structure. For example, the stand 10 includes a mounting mechanism 40 coupled to the frame 12 and configured to secure the frame 12 to the support 48. While the mounting mechanism 40 can be configured a variety of ways, in one arrangement, the mounting mechanism 40 includes a first strap member 42 and a second strap member 44, each strap member 42, 44 having a first end secured to the frame and a second, free end. In use, and with reference to FIG. 2, a user first places a distal portion 46 of the frame 12 against a support 48, such as a tree. The user then extends the free end of each strap member 42, 44 about the support 48, secures the free ends of each strap member 42, 44 to the frame 12, and tightens each strap member 42, 44 against the support 48, such as by use of a ratchet mechanism, to secure the frame 12 thereto.

While the mounting mechanism 40 can be disposed along any portion of the stand 10, in one arrangement, the mounting mechanism 40 is coupled to first frame portion 22 of the stand, as illustrated in FIGS. 1-3. With the mounting mechanism 40 secured to the first frame portion 22, when the first frame portion 22 is secured to the support 48, the second frame portion 24 is free to translate relative to first frame portion 22. Accordingly, the user can adjust the height of the second platform 18 relative to the first platform 14 after mounting the stand 10 to the structure. The first platform 14 is configured as a standing surface for a user. As indicated above, the first platform 14 is disposed at a first end 16 of the frame 12. While the first platform 14 can be secured to the first end 16 of the frame 12 using a variety of mechanisms, in one arrangement the first platform 14 is hingedly coupled to the first end 16 of the frame 12 via a hinge 50. The hinge 50 allows the user to fold the first platform 14 against the proximal side of the frame 12 to minimize the overall size of the stand 10 prior to mounting to a support 48.

In one arrangement, in order to maintain the orientation of the first platform 14 as being substantially parallel to the second platform 18 and to limit rotation of the first platform 14 along direction 54, the platform includes a set of support structures 56 coupled to the frame 12. For example, with reference to FIG. 2, the set of support structures includes a first support structure 56-1 coupled to the first frame element 22-1 and a second support structure 56-2 coupled to the second frame element 22-2. While the set of support structures 56 can be manufactured from a variety of materials, in one arrangement, the set of support structures 56 are manufactured from a cable material, such as a stainless steel cable material.

Figure 7:
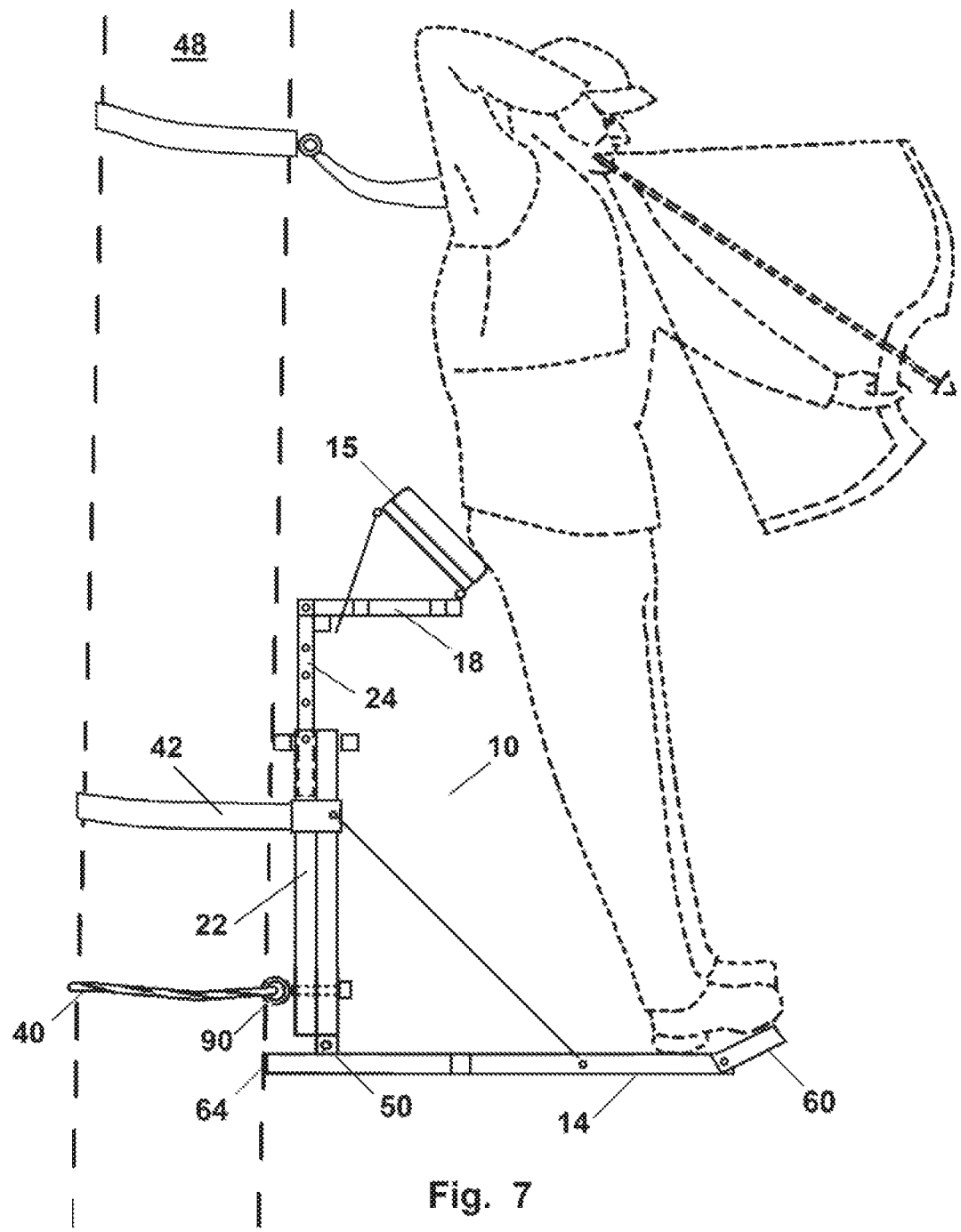
FIG. 7 illustrates an example of the stand of FIG. 1 in use, according to one arrangement.

In one arrangement, as indicated in FIGS. 1-3, the first platform 14 includes a footrest 60 disposed at an angle of between about 0° and 45° relative to the first platform 14. The footrest 60 is configured to allow the user to use his feet to push himself against the seat portion 15 of the second platform 18, as illustrated in FIG. 7. Accordingly, the footrest 60 aids in positioning the user in a partially-standing, partially-sitting position.

The first platform 14 can be configured in a variety of geometries. For example, with reference to FIG. 4, the first platform 14 includes a mesh grate 62 coupled to a first platform frame 63. The mesh grate 62 is configured to minimize the overall weight of the stand 10 while maintaining structural stability of the platform 14.

Figure 4:
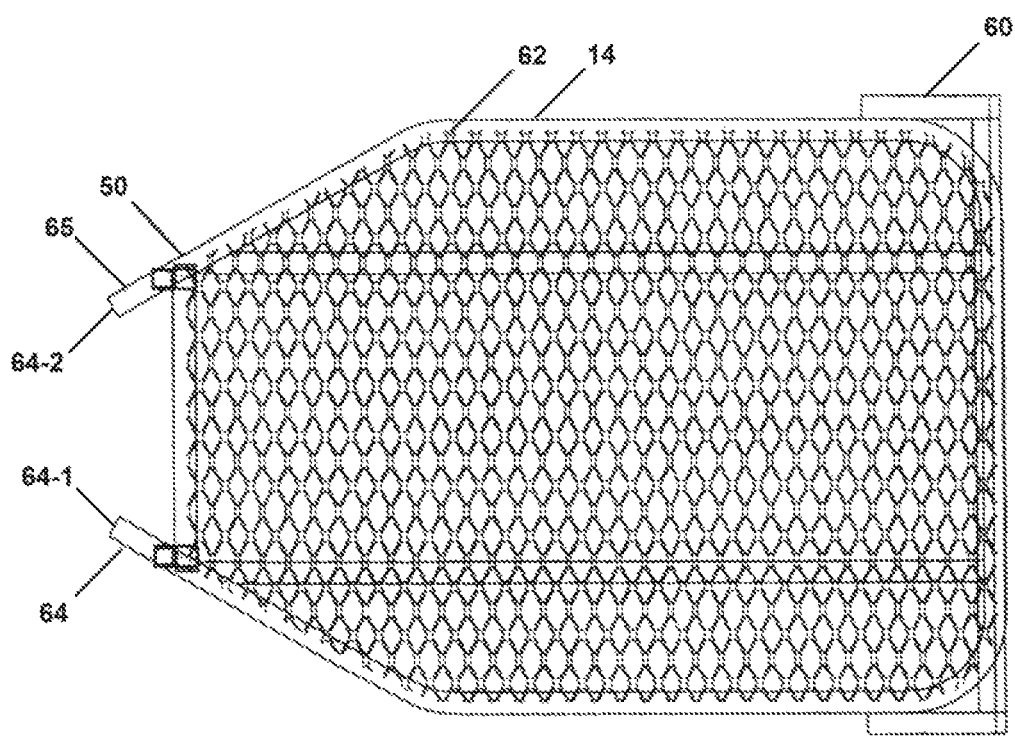
FIG. 4 illustrates a top view of a platform of the stand of FIG. 1, according to one arrangement.
Figure 6:
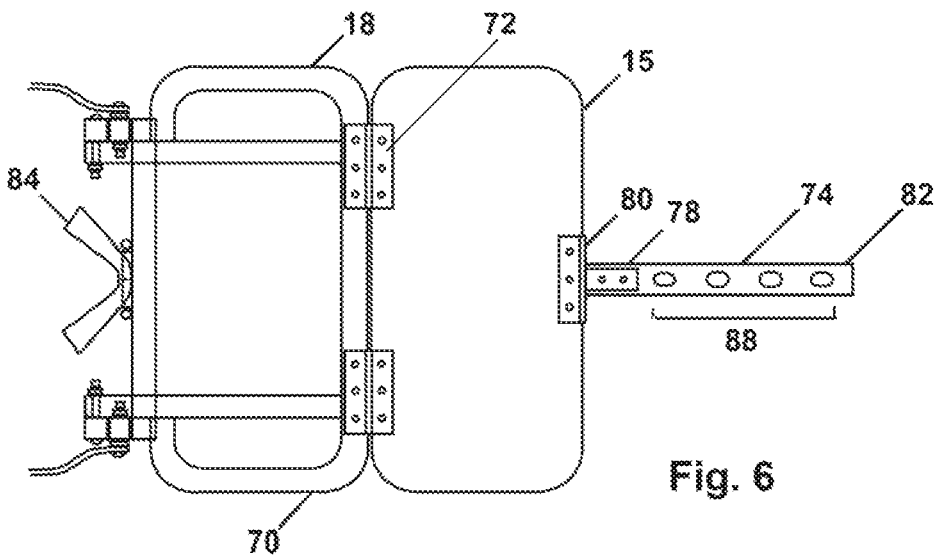
FIG. 6 illustrates a top view of the seat assembly of FIG. 5, according to one arrangement.

In one arrangement, and with continued reference to FIG. 4, the first platform 14 includes a support engagement portion 64 extending and along a distal direction relative to the frame 12, beyond the hinge 50. For example, the support engagement portion 64 includes a first support engagement portion 64-1 disposed on a first side of the first platform 14 and a second support engagement portion 64-2 disposed on a second side of the platform 14. As illustrated, each of the first and second support engagement portions 64-1, 64-2 are disposed at an angle 65 relative to a longitudinal axis of the first platform 14. In use, as indicated in FIG. 6, the support engagement portions 64-1, 64-2 are configured to contact the support 48, or tree, to minimize rotation or movement of the stand 10 relative to the support 48 as the user adjusts his body position.

Figure 5:
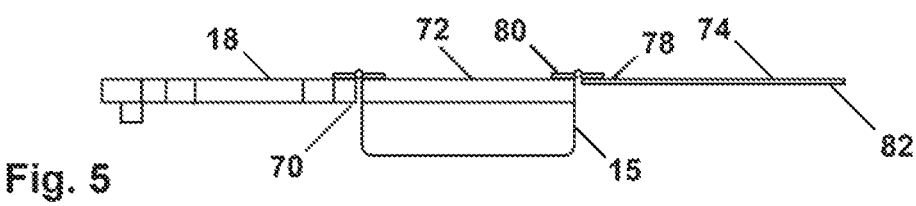
FIG. 5 illustrates a side view of a seat assembly of FIG. 1, according to one arrangement.

Returning to FIGS. 1-3 and as indicated above, the second platform 18 is disposed at a second end 20 of the frame 12 and includes a seat portion 15 configured to support the backside of a user. In one arrangement, the seat portion 15 is coupled to, and configured to rotate relative to, a proximal portion 70 of the second platform 18 between a first seat position and a second seat position. For example, as illustrated in FIGS. 5 and 6, the second platform 18 includes one or more hinges 72 disposed between the seat portion 15 and a first perimeter portion 70 of the second platform 18. The hinge 72 is configured to provide rotation of the seat portion 15 relative to the second platform 18. For example, as indicated in FIGS. 1, 5, and 6, the hinge 72 allows the seat portion 15 to rotate between about 0° and 180° relative to the second platform 18.

In one arrangement, the seat portion 15 is configured to rotate within a limited angle range of between about 0° and 80° relative to the second platform 18. With such a rotation angle, the seat portion 15 allows a user to maintain his partially-standing, partially-sitting position for an extended period of time. In one arrangement, with reference to FIG. 1, the second platform 18 includes a seat adjustment bracket 74 disposed between the seat portion 15 and the second platform 18 at a second perimeter portion of the seat portion 15 and second platform 18. For example, as illustrated in FIGS. 5 and 6, the seat adjustment bracket 74 has a first end 78 coupled to the seat portion 15 by a hinge 78. The seat adjustment bracket 74 also has a second end 82 configured to engage the second perimeter portion of the seat portion 15 to support and secure the seat portion 15 relative to the second platform 18 when rotated to a desired position. For example, the second platform 18 includes a securing mechanism 84, such as a pin, configured to interact with the seat adjustment bracket 74 to secure the seat adjustment bracket to the second platform 18 once the user has rotated the seat portion 15 to a desired position.

In use, and with reference to FIGS. 1 and 3, a user utilizes the seat adjustment bracket 74 to rotate the seat portion 15 about the hinge 80 between a first position, such as the position illustrated in FIG. 1, and a second position, such as the position illustrated in FIG. 3, until the seat portion 15 adequately supports the user's backside. Once in the desired position, the user secures the seat adjustment bracket 74 to the second platform 18 using the securing mechanism.

While the seat adjustment bracket 74 can be configured to position the seat portion 15 at a variety of angles relative to the second platform 18, in one arrangement, the seat adjustment bracket 74 includes an adjustment mechanism 88 configured to allow incremental adjustment of the seat portion 15 relative to the second platform 18. In one arrangement, the seat adjustment bracket 74 defines as the adjustment mechanism 88 a set of openings or depressions configured to interact with the securing mechanism 84 of the second platform 18. For example, as illustrated in FIGS. 5 and 6, the seat adjustment bracket 74 includes a set of four openings which allows the user to set the positioning of the seat portion 15 to five different-angles relative to the second platform 18 (e.g., 0°, 30°, 50°, 65°, 80°). In use, and with reference to FIGS. 1 and 3, a user utilizes the seat adjustment bracket 74 to adjust the angle of the seat portion 15 relative to the second platform 18. Once disposed in a particular position, the user aligns the adjustment mechanism 88 relative to the securing mechanism 74 and, once aligned, engages the securing mechanism 74 with the adjustment mechanism 88 (e.g., with a particular opening of the adjustment mechanism 88) to fix or lock the position of the seat portion 15 relative to the second platform 18.

FIG. 7 illustrates an example of the stand 10 secured to a support 48 and utilized by a user. Initially, the user carries the stand 10 to a particular vertical location of the support 48, such as by using a ladder. Once in a desired vertical position relative to the ground, the user secures the stand 10 to the support 48 using the mounting mechanism 40. The user then positions the second platform 18 at a particular distance from the first platform 14 to correspond to his physical geometry. For example, as indicated above, by moving the second frame portion 24 relative to the first frame portion 22 the user can position the second platform 18 relative to the first platform 14 such that the second platform 18 is substantially aligned with a resting position of the user's backside. With the second platform 18 disposed in the desired position, the operator can secure the second frame portion 24 to the first frame portion 22, such as by a locking mechanism (not shown). The user can then adjust the angle of the seat portion 15 relative to the second platform 18 such that the user can rest on the stand 10 in a partially standing, partially-sitting position.

With such a configuration, the stand 10 positions the user to view a target, such as an animal, while maintaining the user in a firing-ready position. Accordingly, the stand allows the user to move a minimal amount when targeting the animal, thereby minimizing the chances of alerting the animal to the user's presence. Also, with such a configuration, the stand reduces the load on the user's legs over time, thereby minimizing leg fatigue and providing a level of the safety of the user.

While various embodiments of the innovation have been particularly shown and described, it will be understood by those skilled in the art that various changes in form and details may be made therein without departing from the spirit and scope of the innovation as defined by the appended claims.

As indicated above, the mounting mechanism 40 can be coupled to first frame portion 22 of the stand, as illustrated in FIGS. 1-3. With such a configuration, when the first frame portion 22 is secured to the support 48, the second frame portion 24 is free to translate relative to first frame portion 22 and the user can adjust the height of the second platform 18 relative to the first platform 14 after mounting the stand 10 to the support 48. Such indication is by way of example, only. In one arrangement, the mounting mechanism 40 is coupled to the second frame portion 24. With such a configuration, when the second frame portion 24 is secured to the support 48, the first frame portion 22 is free to translate relative to second frame portion 24 and the user can adjust the height of the first platform 14 relative to the second platform 18 after mounting the stand 10 to the support 48.

As indicated above, the stand 10 is configured to position a user in a partially-standing, partially sitting position. Such description is by way of example only. As indicated above, the second frame portion 24 can position the second platform 18 at a variable distance of between about 24 inches and 36 inches relative to the first platform 14. Accordingly, with the second frame portion 24 positioned at a distance of about 24 inches from the first platform 14, and with the seat portion 15 disposed at a 0° angle relative to the second platform 18 as illustrated in FIG. 1, the stand 10 allows the user to position himself in a fully sitting position.

As indicated above, to install the stand 10 in a tree or support, the user carries the stand 10 to a particular vertical location of the support 48, such as by using a ladder. Such indication is by way of example only. In one arrangement, the stand 10 can be advanced vertically relative to the support using a variety of mechanisms, such as an up-haul system.

Figure 8:
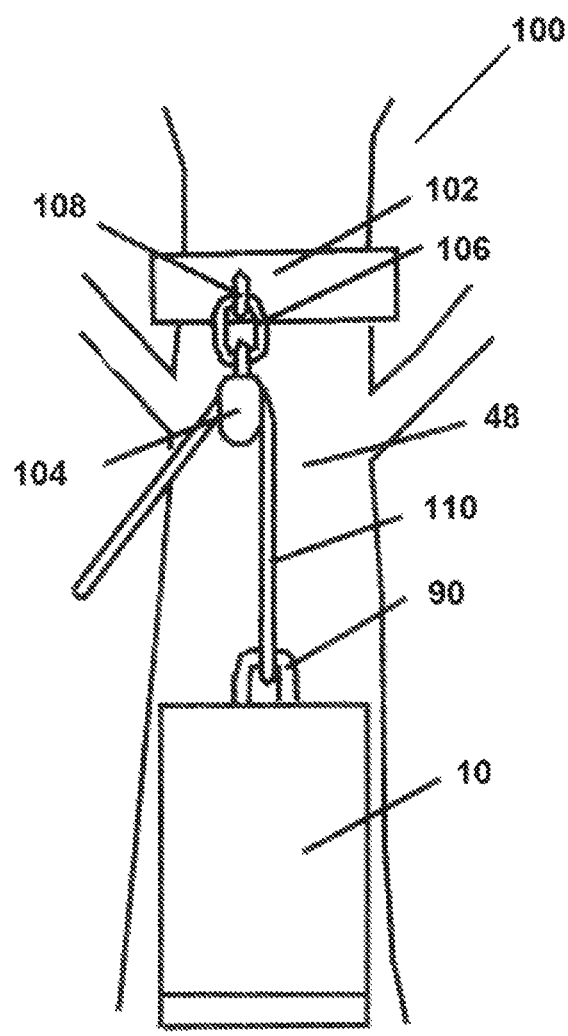
FIG. 8 illustrates an up-haul system utilized with the stand of FIG. 1.

As indicated in FIGS. 1, 3, and 7, in one arrangement the stand 10 includes an up-haul attachment mechanism 90, such as an eye-bolt, secured to the frame 12. The user can utilize the up-haul attachment mechanism 90 as part of the up-haul system 100 illustrated in FIG. 8.

The up-haul system 100 includes a support mount 102, such as a metallic plate configured to be secured to the support 48. The up-haul system 100 also includes a pulley 104 secured to the support mount 102 such as by a carabiner 106 secured to an eye-bolt 108 of the support mount 102.

In use, the user carries the up-haul system 100 to a particular vertical location of the support 48, such as by using a ladder. The user secures the support mount 102 to the support 48, such as by a belt attached to the free ends of the support mount 102. The user then passes a rope 110 through the pulley 106 and descends the support 48. Once on the ground, the user secures a first free end of the rope 110 to the up-haul attachment mechanism 90 and pulls on the second free end of the rope 110 to advance the stand 10 toward the support mount 102. Once in a desired position, the user secures the second free end of the rope 110 to maintain the position of the stand relative to the support mount 102. Finally, the user can ascend the support 48, such as by the ladder, and secure the stand 10 to the support 48 as described above. Accordingly, the up-haul system 100 allows the user to advance the stand 10 to a particular location on the support 48 without requiring the user to physically carry the stand 10 up the ladder to the desired location.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A stand, comprising:
    a frame;
    a mounting mechanism coupled to the frame, the mounting mechanism configured to couple the frame to a support;
    a first platform disposed at a first end of the frame, the first platform configured to extend generally orthogonal to the frame when the stand is in a use position;
    a second platform disposed at a second end of the frame, the second end opposing the first end, the second platform extending generally orthogonal to the frame and generally parallel to the first platform, the second platform configured to translate relative to the first platform between at least a first position and a second position to dispose the second platform at one or more predetermined distances from the first platform, the second platform defining a platform first side, adjacent the frame, and a platform second side, opposite the platform first side and the frame;
    a seat portion coupled to the second platform, the seat portion configured to adjust between a first seat position and a second seat position, the seat portion having a seat first side, adjacent the frame when the seat portion is in the first seat position, and a seat second side, opposite the seat first side and the frame, wherein when the seat is in the first seat position, the seat is generally parallel the second platform, and when the seat is in the second seat position, the second seat position is angled relative the second platform;
    a hinge disposed between a bottom of the seat portion at an outermost perimeter of a bottom of the seat second side and the platform second side of the second platform, the hinge configured to provide rotation of the seat portion relative to the second platform; and
    a seat adjustment bracket, formed as an elongate member, having a bracket first end having a pivotable attachment to the seat portion adjacent the seat first side, the seat adjustment bracket having a bracket second end, opposite the bracket first end and unattached to the seat portion, that is rotatable about an arc, relative the seat portion, about the pivotable attachment, and is removably engageable with the second platform to secure the seat portion in the second seat position.

2. The stand of claim 1, wherein the frame comprises a first frame portion and a second frame portion, the first platform coupled to the first frame portion and the second platform coupled to the second frame portion, the second frame portion configured to translate relative to the first frame portion to position the second platform between the first position and the second position.

3. The stand of claim 2, wherein the mounting mechanism is coupled to the first frame portion.

4. The stand of claim 1, wherein the seat portion is configured to rotate between the first seat position and the second seat position within an angle range of between about 0° and 80° relative to the second platform.

5. The stand of claim 1, wherein the mounting mechanism comprises a first strap member and a second strap member, the first strap member and the second strap member configured to secure the frame to the support, the support configured as a substantially cylindrical structure.

6. The stand of claim 1, wherein the seat adjustment bracket comprises an adjustment mechanism configured to allow incremental adjustment of the seat portion relative to the second platform.

7. The stand of claim 1, wherein the first platform is hingedly coupled to the first end of the frame.

8. The stand of claim 1, wherein the first platform comprises a support engagement portion.

9. The stand of claim 1, wherein the first platform comprises a footrest disposed at an angle of between about 0° and 45° relative to the first platform.

10. A stand, comprising:
a frame;
a mount coupled to the frame, the mount configured to couple the frame to a support;
a first platform disposed at a first end of the frame and extending from the frame;
a second platform disposed at a second end of the frame, the second end opposing the first end, the second platform extending generally orthogonal to the frame and generally parallel to the first platform, the second platform configured to translate relative to the first platform between at least a first position and a second position to dispose the second platform at a distance of between about 24 inches and 36 inches relative to the first platform, the second platform defining a platform first side, adjacent the frame, and a platform second side, opposite the platform first side and the frame;
a seat portion coupled to the second platform, the seat portion configured to rotate relative to the second platform between a first seat position and a second seat position and within an angle range of between about 0° and 80° relative to the second platform, the seat portion having a seat first side, adjacent the frame when the angle is about 0° with the first seat position that is generally parallel the second platform, and a seat second side, opposite the seat first side and the frame;
a hinge disposed between a bottom of the seat portion at an outermost perimeter of a bottom of the seat second side and the platform second side of the second platform, the hinge configured to provide rotation of the seat portion relative to the second platform; and
a seat adjustment bracket formed as an elongate member, having a bracket first end having a pivotable attachment to the seat portion adjacent the seat first side, the seat adjustment bracket having a bracket second end, opposite the bracket first end and unattached to the seat portion, that is rotatable about an arc, relative to the seat portion, about the pivotable attachment, and is removably engageable with the second platform to secure the seat in the second seat position.

11. The stand of claim 10, wherein the frame comprises a first frame portion and a second frame portion, the first platform coupled to the first frame portion and the second platform coupled to the second frame portion, the second frame portion configured to translate relative to the first frame portion to position the second platform between the first position and the second position.

12. The stand of claim 11, wherein the mount is coupled to the first frame portion.

13. The stand of claim 10, wherein the mount comprises a first strap member and a second strap member, the first strap member and the second strap member configured to secure the frame to the support, the support configured as a substantially cylindrical structure.

14. The stand of claim 10, wherein the seat adjustment bracket comprises an adjustment mechanism configured to allow incremental adjustment of the seat portion relative to the second platform.

15. The stand of claim 10, wherein the first platform is hingedly coupled to the first end of the frame.

16. The stand of claim 10, wherein the first platform comprises a support engagement portion extending along a distal direction relative to the frame.

17. The stand of claim 10, wherein the first platform comprises a footrest disposed at an angle of between about 0° and 45° relative to the first platform.

* * * * *